United States Patent
Chang

(10) Patent No.: US 9,970,575 B2
(45) Date of Patent: May 15, 2018

(54) COMPOSITION, TAPE AND COMPOSITE PIPE MADE THEREFROM AND A METHOD OF PRODUCING COMPOSITE PIPE

(71) Applicant: Dow Global Technologies LLC, Midland, MI (US)

(72) Inventor: Dane Chang, Sugar Land, TX (US)

(73) Assignee: Dow Global Technologies LLC, Midland, MI (US)

( * ) Notice: Subject to any disclaimer, the term of this patent is extended or adjusted under 35 U.S.C. 154(b) by 336 days.

(21) Appl. No.: 14/428,412

(22) PCT Filed: Sep. 20, 2013

(86) PCT No.: PCT/US2013/060796
§ 371 (c)(1),
(2) Date: Mar. 16, 2015

(87) PCT Pub. No.: WO2014/052173
PCT Pub. Date: Apr. 3, 2014

(65) Prior Publication Data
US 2015/0276094 A1 Oct. 1, 2015

Related U.S. Application Data

(60) Provisional application No. 61/706,970, filed on Sep. 28, 2012.

(51) Int. Cl.
*B32B 27/00* (2006.01)
*F16L 9/14* (2006.01)
(Continued)

(52) U.S. Cl.
CPC ............ *F16L 9/14* (2013.01); *B29C 65/1403* (2013.01); *B29C 65/1477* (2013.01);
(Continued)

(58) Field of Classification Search
None
See application file for complete search history.

(56) References Cited

U.S. PATENT DOCUMENTS 5,173,139 A * 12/1992 Rippingale ......... B29C 47/0023
156/185
5,354,521 A * 10/1994 Goodman ............... F16L 11/12
264/108
(Continued)

FOREIGN PATENT DOCUMENTS

CN 1542040 11/2004
CN 101706021 5/2010
(Continued)

OTHER PUBLICATIONS

Abstract of CN 102767648 A (pub 2012).*
(Continued)

*Primary Examiner* — Kevin M Bernatz
(74) *Attorney, Agent, or Firm* — Husch Blackwell LLP

(57) ABSTRACT

A composition comprising: (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a) is provided. Further provided is a tape comprising the composition, a pipe comprising the tape and a method of making such pipe.

16 Claims, 3 Drawing Sheets

(51) Int. Cl.
  *B32B 27/18* (2006.01)
  *B32B 27/32* (2006.01)
  *B32B 1/08* (2006.01)
  *C08K 7/02* (2006.01)
  *F16L 9/12* (2006.01)
  *C08K 9/02* (2006.01)
  *B29C 65/14* (2006.01)
  *B32B 37/06* (2006.01)
  *B32B 37/16* (2006.01)
  *H01F 3/08* (2006.01)
  *B29D 23/00* (2006.01)
  *B29K 23/00* (2006.01)
  *B29K 509/00* (2006.01)
  *B29L 23/00* (2006.01)

(52) U.S. Cl.
  CPC .............. *B29D 23/001* (2013.01); *B32B 1/08* (2013.01); *B32B 27/18* (2013.01); *B32B 27/32* (2013.01); *B32B 37/06* (2013.01); *B32B 37/16* (2013.01); *C08K 7/02* (2013.01); *C08K 9/02* (2013.01); *F16L 9/12* (2013.01); *H01F 3/08* (2013.01); *B29K 2023/065* (2013.01); *B29K 2509/00* (2013.01); *B29L 2023/22* (2013.01); *B32B 2250/02* (2013.01); *B32B 2260/04* (2013.01); *B32B 2264/102* (2013.01); *B32B 2305/08* (2013.01); *B32B 2307/208* (2013.01); *B32B 2310/0806* (2013.01); *B32B 2323/043* (2013.01); *B32B 2597/00* (2013.01)

(56) References Cited

U.S. PATENT DOCUMENTS

| | | | | |
|---|---|---|---|---|
| 6,629,547 B1* | 10/2003 | Yamaguchi | ....... | B29C 66/73921 138/125 |
| 6,767,611 B2* | 7/2004 | Hayashi | ............ | G11B 5/712 428/328 |
| 9,068,681 B1* | 6/2015 | Lyman | .................. | F16L 55/00 |
| 2007/0043182 A1* | 2/2007 | Martin | ............... | C08F 210/16 526/119 |
| 2007/0197716 A1* | 8/2007 | Krishnaswamy | ..... | C08F 210/16 524/543 |
| 2007/0224459 A1* | 9/2007 | Hsieh | ................... | G11B 5/733 428/844 |
| 2012/0043496 A1* | 2/2012 | Cabrera Perez | ..... | B01J 20/0225 252/62.54 |
| 2012/0080637 A1 | 4/2012 | Herzog et al. | | |
| 2012/0327504 A1* | 12/2012 | Kayashima | ............. | C09C 1/021 359/296 |
| 2013/0108818 A1* | 5/2013 | Cavalieri | ................. | B32B 1/08 428/36.9 |

FOREIGN PATENT DOCUMENTS

| | | | |
|---|---|---|---|
| CN | 102408610 | 4/2012 | |
| DE | 19841121 | 3/2000 | |
| EP | 1939149 A2 * | 7/2008 | .......... C03C 25/101 |
| WO | WO 97/10941 | 3/1997 | |
| WO | 2008113805 | 9/2008 | |

OTHER PUBLICATIONS

EP Response to Office Action dated Aug. 4, 2016; from EP counterpart Application No. 13771027.3.
EP Office Action dated Jan. 26, 2016; from EP counterpart Application No. 13771027.3.
Chinese Office Action dated Jan. 4, 2017; from Chinese counterpart Application No. 201380061678.4.
EP Office Action dated Jun. 6, 2016; from EP counterpart Application No. 13771027.3.
EP Response to Office Action dated Mar. 25, 2016; from EP counterpart Application No. 13771027.3.
PCT/US2013/060796 International Search Report and Written Opinion dated Nov. 12, 2013, 8 pages.
PCT/US2013/060796 International Preliminary Report on Patentability dated Apr. 9, 2015, 7 pages.
European Patent Application No. 13771027.3 Communication under Rule/161/162 dated May 11, 2015, 3 pages.

* cited by examiner

COMPOSITION, TAPE AND COMPOSITE PIPE MADE THEREFROM AND A METHOD OF PRODUCING COMPOSITE PIPE

FIELD OF INVENTION

The instant invention relates to a composition, tape and composite pipe made therefrom and method of producing composite pipe.

BACKGROUND OF THE INVENTION

Non-conventional gas (shale), enhanced oil recovery (EOR) and other energy-related technologies are requiring new reservoir development techniques and are also driving new pipeline developments to transport the gases and fluids in the most economical manor (i.e. shale gas, carbon dioxide, hot water, steam, ethanol). Pipelines to transport more corrosive liquids and gases as well as sour crudes and bio-sourced fuels demand corrosion protection pipelines and pipeline coating products, specifically composite pipelines. Composite pipes may provide the strength and corrosion resistance needed by such EOR technologies as well as for conveyance of corrosive fluids. The production of some composite pipes having an inner bonding tape layer, however, is very energy intensive, requiring that the entire pipe be heated so as to soften and/or melt the inner bonding tape layer to bond to adjacent core and shell layers. In some instances, for very large diameter pipes, it may be necessary to heat the pipe from both the inside and outside, thereby further increasing pipe costs. Furthermore, for pipes used in high pressure systems, the thicknesses of the core and/or shell layers may be substantial. Thus, to raise the temperature of the inner bonding tape layer, the core and/or shell layers must be subjected to temperatures much higher than needed to soften and/or melt the inner bonding tape layer, yet further increasing pipe production costs. Such high temperatures may, in some cases, be sufficient to warp the pipe shape, leading to waste product.

SUMMARY OF THE INVENTION

The instant invention is a composition, tape and composite pipe made therefrom and method of producing composite pipe.

In one embodiment, the instant invention provides a composition comprising: (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of thermoplastic polymer (a).

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
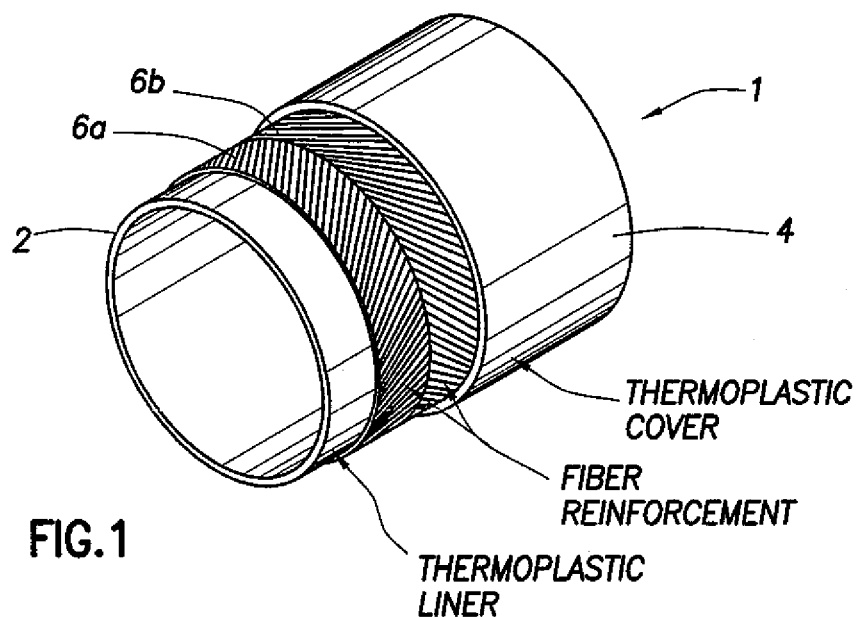
FIG. 1 is a schematic of a partial cutaway of a composite pipe according to one embodiment of the invention.
Figure 2:
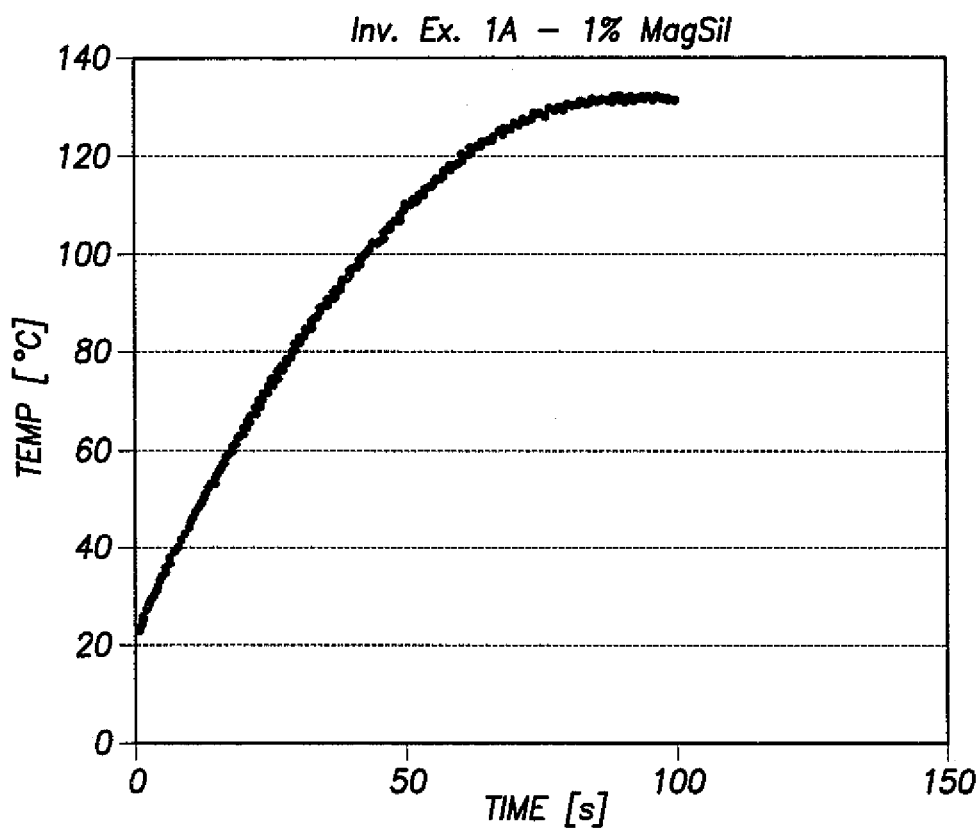
FIG. 2 is a graph illustrating the temperature rise as a function of time of a tape comprising 1 wt % particles and subjected to a magnetic field of 440 kHz.
Figure 3:
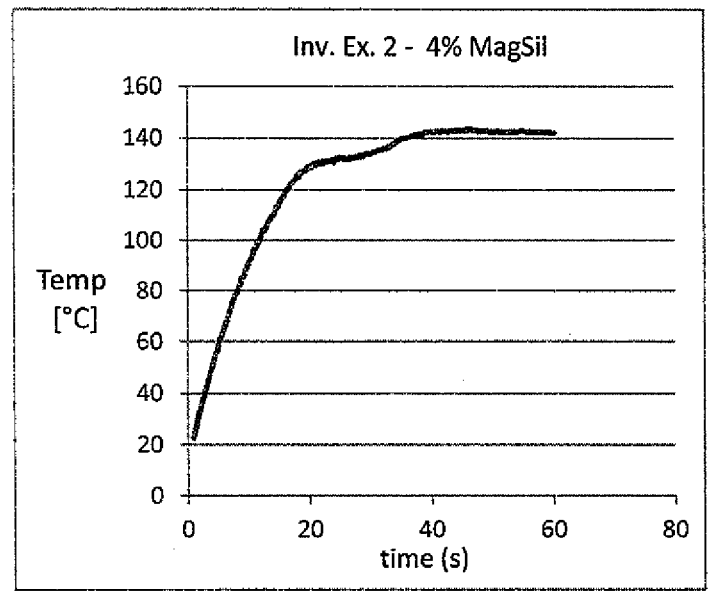
FIG. 3 is a graph illustrating the temperature rise as a function of time of a tape comprising 4 wt % particles and subjected to a magnetic field of 440 kHz.
Figure 4:
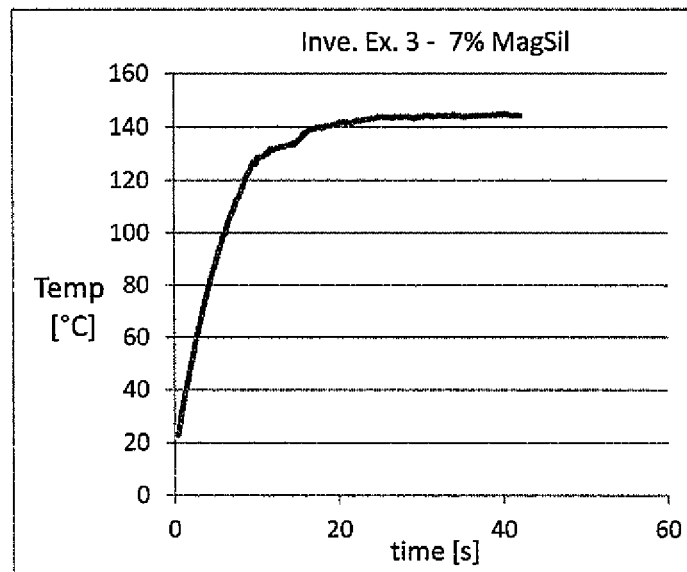
FIG. 4 is a graph illustrating the temperature rise as a function of time of a tape comprising 7 wt % particles and subjected to a magnetic field of 440 kHz.
Figure 5:
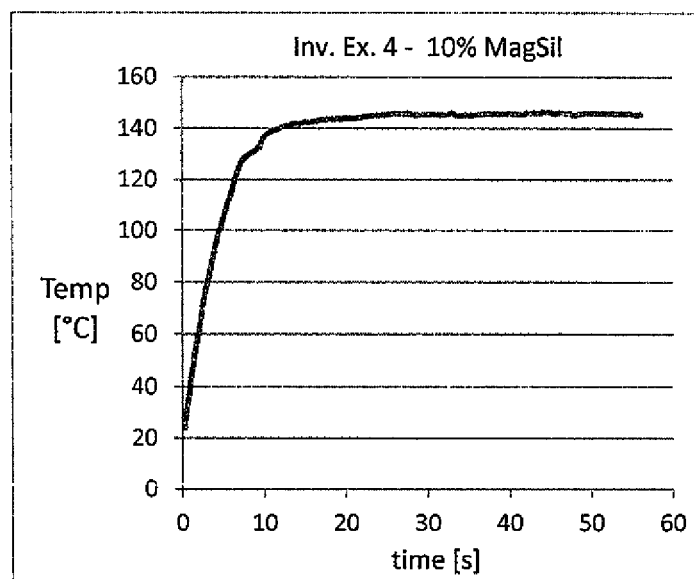
FIG. 5 is a graph illustrating the temperature rise as a function of time of a tape comprising 10 wt % particles and subjected to a magnetic field of 440 kHz.

The instant invention is a composition, method of producing the same, articles made therefrom, and methods for making such articles.

The composition according to the present invention comprises: (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a).

Any thermoplastic polymer suitable for use in a composite pipe may be used in the composition. For example, thermoplastic polymer useful in the composition includes polymers containing units derived from olefins, functionalized olefins, vinyl chloride, styrene, amides, imides, sulfones, (meth)acrylate, and combinations thereof.

In a particular embodiment, the thermoplastic polymer is an ethylene-based polymer, propylene-based polymer, or combination thereof.

As used herein, "ethylene-based polymer" includes polyethylene homopolymers, ethylene copolymerized with one or more copolymers, e.g., one or more α-olefin copolymers, and combinations thereof.

As used herein, "propylene-based polymer" includes polypropylene homopolymers, propylene copolymerized with one or more copolymers, e.g., one or more α-olefin copolymers, and combinations thereof.

As used herein, "structural fibers" means particles, as readily known in the art, to provide strength to polymer composite materials. Structural fibers may have any appropriate composition, length, and/or length to diameter ratio.

In an alternative embodiment, the instant invention further provides a tape comprising: a composition which comprises (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a). The tape in accordance with the instant invention may be formed using any known technique for forming tapes used in composite pipes, including for example, extrusion of the composition through a flat die or compression molding.

In another alternative embodiment, the instant invention further provides a composite pipe comprising at least one layer comprising the tape according to any of the embodiments disclosed herein.

In yet another alternative embodiment, the instant invention further provides a composite pipe comprising: at least one core layer; at least one shell layer; and at least one inner layer disposed between the core and shell layers, wherein the at least one inner layer comprises a composition which comprises (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a).

In yet another alternative embodiment, the instant invention further provides a process for making a composite pipe comprising: selecting a core layer; selecting a tape comprising a composition which comprises (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a); disposing the tape onto at least one surface of the core layer thereby forming a core-tape intermediate; and subjecting the core-tape intermediate to a magnetic field to form a bond between the tape and the core layer.

In yet another alternative embodiment, the instant invention further provides a process for making a composite pipe comprising: selecting a core layer; selecting a tape comprising a composition which comprises (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a); disposing the tape onto at least one surface of the core layer thereby forming a core-tape intermediate; forming one or more shell layers over the core-tape intermediate to form a pre-pipe; and subjecting the pre-pipe to a magnetic field to form a bond between the tape and one or more adjacent layers.

In an alternative embodiment, the instant invention provides a process for making a composite pipe in accordance with any of the preceding embodiments, except that additional plies of the tape may be disposed onto an outer surface of the core-tape intermediate.

FIG. 1 illustrates a composite pipe 1 having a core layer 2, a shell layer 4, and two plies of tape 6a and 6b.

In an alternative embodiment, the instant invention provides a process for making a composite pipe in accordance with any of the preceding embodiments, except that the process for making a composite pipe further comprising applying heat to the pre-pipe.

In an alternative embodiment, the instant invention provides a process for making a composite pipe in accordance with any of the preceding embodiments, except that the process for making a composite pipe further comprising applying heat to the core-tape intermediate.

In an alternative embodiment, the instant invention provides a process for making a composite pipe in accordance with any of the preceding embodiments, except that the subjecting the core-tape intermediate or pre-pipe to a magnetic field raises the temperature of the tape to a temperature greater than the melting point of the thermoplastic polymer.

In an alternative embodiment, the instant invention provides a process for making a composite pipe in accordance with any of the preceding embodiments, except that the temperature greater than the melting point of the thermoplastic polymer is reached by subjecting the pre-pipe to a magnetic field for a time between 1 and 50 seconds.

In an alternative embodiment, the instant invention provides a process for making a composite pipe in accordance with any of the preceding embodiments, except that the thermoplastic polymer is an ethylene-based polymer having a melting point from 100 and 140° C. and is reached by subjecting the pre-pipe to a magnetic field for a time between 5 and 15 seconds. All individual values and subranges from 100 to 140° C. are included herein and disclosed herein; for example, the melting temperature of the ethylene-based polymer may range from a lower limit of 100, 105, 110, 115, 120, 125, 130, 135 or 138° C. to an upper limit of 104, 109, 114, 119, 124, 129, 134, 139 or 140° C. For example, the melting point of the ethylene-based polymer may be in the range of from 100 to 140° C., or in the alternative, the melting point of the ethylene-based polymer may be in the range of from 125 to 130° C., or in the alternative, the melting point of the ethylene-based polymer may be in the range of from 120 to 138° C., or in the alternative, the melting point of the ethylene-based polymer may be in the range of from 115 to 140° C.

In another alternative embodiment, the instant invention further provides a system for conveying high pressure fluids comprising the pipe according to any embodiment herein. Systems according to the invention may further comprise components typical for systems for conveying high pressure fluids, including, for example, valves and pumps.

In an alternative embodiment, the instant invention provides a composition, tape, composite pipe, process for making a composite pipe, and system for conveying high pressure fluids in accordance with any of the preceding embodiments, except that the thermoplastic polymer is an ethylene-based polymer having a density in the range of from 0.880 to 0.975 g/cm$^3$ and an $I_2$ in the range of from 0.01 to 1000 g/10 minutes.

In an alternative embodiment, the instant invention provides a composition, tape, composite pipe, process for making a composite pipe, and system for conveying high pressure fluids in accordance with any of the preceding embodiments, except that the thermoplastic polymer is an ethylene-based polymer having a molecular weight distribution (Mw/Mn) in the range of from 1.70 to 35.

All individual values and subranges from 0.880 to 0.975 g/cm$^3$ are included herein and disclosed herein; for example, the density can be from a lower limit of 0.880, 0.907, 0.919, 0.928, 0.940, 0.948, 0.957, 0.965, 0.974 or 0.974 g/cm$^3$ to an upper limit of 0.885, 0.897, 0.923, 0.936, 0.941, 0.947, 0.954, 0.959, 0.965, 0.972, or 0.975 g/cm$^3$. For example, the ethylene-based polymer may have a density in the range of 0.880 to 0.975 g/cm$^3$; or in the alternative, the ethylene-based polymer may have a density in the range of 0.890 to 0.96 g/cm$^3$; or in the alternative, the ethylene-based polymer may have a density in the range of 0.94 to 0.955 g/cm$^3$; or in the alternative, the ethylene-based polymer may have a density in the range of 0.907 to 0.959 g/cm$^3$; or in the alternative, the ethylene-based polymer may have a density in the range of 0.880 to 0.954 g/cm$^3$; or in the alternative, the ethylene-based polymer may have a density in the range of 0.880 to 0.947 g/cm$^3$; or in the alternative, the ethylene-based polymer may have a density in the range of 0.880 to 0.941 g/cm$^3$; or in the alternative, the ethylene-based polymer may have a density in the range of 0.911 to 0.972 g/cm$^3$; or in the alternative, the ethylene-based polymer may have a density in the range of 0.940 to 0.975 g/cm$^3$; or in the alternative, the ethylene-based polymer may have a density in the range of 0.924 to 0.930 g/cm$^3$; or in the alternative, the ethylene-based polymer may have a density in the range of 0.926 to 0.936 g/cm$^3$; or in the alternative, the ethylene-based polymer may have a density in the range of 0.940 to 0.946 g/cm$^3$; or in the alternative, the ethylene-based polymer may have a density in the range of 0.946 to 0.953 g/cm$^3$; or in the alternative, the ethylene-based polymer may have a density in the range of 0.946 to 0.956 g/cm$^3$; or in the alternative, the ethylene-based polymer may have a density in the range of 0.948 to 0.956 g/cm³; or in the alternative, the ethylene-based polymer may have a density in the range of 0.930 to 0.940 g/cm³.

All individual values and subranges of a molecular weight distribution ($M_w/M_n$) (measured according to the conventional GPC method) from 1.70 to 35 are included herein and disclosed herein; for example, the molecular weight distribution ($M_w/M_n$) can be from a lower limit of 1.70, 5, 14.9, 17.5, 20, 26.7, 30.1, or 34 to an upper limit of 1.85, 6, 15.5, 18.8, 22, 29.9, or 35. For example, the ethylene-based polymer may have a molecular weight distribution ($M_w/M_n$) in the range of 1.70 to 35; or in the alternative, the ethylene-based polymer may have a molecular weight distribution ($M_w/M_n$) in the range of 1.70 to 15; or in the alternative, the ethylene-based polymer may have a molecular weight distribution ($M_w/M_n$) in the range of 1.70 to 12.5; or in the alternative, the ethylene-based polymer may have a molecular weight distribution ($M_w/M_n$) in the range of 1.70 to 3.6; or in the alternative, the ethylene-based polymer may have a molecular weight distribution ($M_w/M_n$) in the range of 1.70 to 2.95; or in the alternative, the ethylene-based polymer may have a molecular weight distribution ($M_w/M_n$) in the range of 5 to 15; or in the alternative, the ethylene-based polymer may have a molecular weight distribution ($M_w/M_n$) in the range of 5 to 35; or in the alternative, the ethylene-based polymer may have a molecular weight distribution ($M_w/M_n$) in the range of 12.5 to 22.5; or in the alternative, the ethylene-based polymer may have a molecular weight distribution ($M_w/M_n$) in the range of 20 to 35; or in the alternative, the ethylene-based polymer may have a molecular weight distribution ($M_w/M_n$) in the range of 1.70 to 3.6; or in the alternative, the ethylene-based polymer may have a molecular weight distribution ($M_w/M_n$) in the range of 2 to 15.

All individual values and subranges of a melt index ($I_2$) from 0.01 to 1000 g/10 minutes are included herein and disclosed herein; for example, the melt index ($I_2$) can be from a lower limit of 0.01, 0.05, 0.5, 1, 2, 3, 5, 10, 20, 30, 40, 60, 80, or 100 g/10 minutes, to an upper limit of 0.02, 0.08, 1.2, 5, 10, 30, 50, 80, 90, 110, 200, 220, 250, 300, 500, 800, or 1000 g/10 minutes. For example, the ethylene-based polymer may have a melt index ($I_2$) in the range of 0.01 to 1000 g/10 minutes; or in the alternative, the ethylene-based polymer may have a melt index ($I_2$) in the range of 10 to 300 g/10 minutes; or in the alternative, the ethylene-based polymer may have a melt index ($I_2$) in the range of 20 to 200 g/10 minutes; or in the alternative, the ethylene-based polymer may have a melt index ($I_2$) in the range of 30 to 100 g/10 minutes.

In an alternative embodiment, the instant invention provides a composition, tape, composite pipe, process for making a composite pipe, and system for conveying high pressure fluids in accordance with any of the preceding embodiments, except that the thermoplastic polymer is an ethylene-based polymer having a density in the range of 0.925 to 0.960 g/cm³, and a melt index ($I_2$) in the range of 20 to 200 g/10 minutes.

In an alternative embodiment, the instant invention provides a composition, tape, composite pipe, process for making a composite pipe, and system for conveying high pressure fluids in accordance with any of the preceding embodiments, except that the thermoplastic polymer is an ethylene-based polymer having a density in the range of 0.940 to 0.955 g/cm³, and a melt index ($I_2$) in the range of 30 to 100 g/10 minutes.

In an alternative embodiment, the instant invention provides a composition, tape, composite pipe, process for making a composite pipe, and system for conveying high pressure fluids in accordance with any of the preceding embodiments, except that the thermoplastic polymer comprises a linear low density polyethylene composition comprising: less than or equal to 100 percent by weight of the units derived from ethylene; less than 35 percent by weight of units derived from one or more α-olefin comonomers; wherein said linear low density polyethylene composition has a density in the range of 0.905 to 0.925 g/cm³, a molecular weight distribution (Mw/Mn) in the range of 2.5 to 4.5, a melt index ($I_2$) in the range of 0.1 to 3 g/10 minutes, a molecular weight distribution (Mz/Mw) in the range of from 2.2 to 3, and vinyl unsaturation of less than 0.1 vinyls per one thousand carbon atoms present in the backbone of said composition. In a specific embodiment, the linear low density polyethylene composition exhibits a zero shear viscosity ratio (ZSVR) in the range from 1 to 1.2.

The linear low density polyethylene composition comprises (a) less than or equal to 100 percent, for example, at least 65 percent, at least 70 percent, or at least 80 percent, or at least 90 percent, by weight of the units derived from ethylene; and (b) less than 35 percent, for example, less than 25 percent, or less than 20 percent, by weight of units derived from one or more α-olefin comonomers.

All individual values and subranges from 0.905 to 0.925 g/cm³ are included herein and disclosed herein; for example, the density can be from a lower limit of 0.905, 0.908, 0.910, or 0.912 g/cm³ to an upper limit of 0.918, 0.919, 0.920, 0.922, or 0.925 g/cm³.

All individual values and subranges from 2.5 to 4.5 are included herein and disclosed herein; for example, the molecular weight distribution ($M_w/M_n$) can be from a lower limit of 2.5, 2.7, 2.9, 3.0 to an upper limit of 3.6, 3.8, 3.9, 4.2, 4.4, or 4.5.

The linear low density polyethylene composition has a melt index ($I_2$) in the range of from 0.1 to 3 g/10 minutes. All individual values and subranges from 0.1 to 3 g/10 minutes are included herein and disclosed herein; for example, the melt index ($I_2$) can be from a lower limit of 0.1, 0.2, 0.4, 0.5, or 0.6 g/10 minutes to an upper limit of 1.2, 1.5, 1.8, 2.0, 2.2, 2.5, or 3.0 g/10 minutes.

In an alternative embodiment, the linear low density polyethylene composition may have a molecular weight ($M_w$) in the range of 50,000 to 250,000 daltons. All individual values and subranges from 50,000 to 250,000 daltons are included herein and disclosed herein; for example, the molecular weight ($M_w$) can be from a lower limit of 50,000, 60,000, 70,000 daltons to an upper limit of 150,000, 180,000, 200,000 or 250,000 daltons.

In an alternative embodiment, the linear low density polyethylene composition may have a molecular weight distribution ($M_z/M_w$) (measured according to the conventional GPC method) in the range of from 2.2 to 3. All individual values and subranges from 2.2 to 3 are included herein and disclosed herein.

The linear low density polyethylene composition may comprise less than 35 percent by weight of units derived from one or more α-olefin comonomers. All individual values and subranges from less than 35 weight percent are included herein and disclosed herein; for example, the linear low density polyethylene composition may comprise less than 25 percent by weight of units derived from one or more α-olefin comonomers; or in the alternative, the linear low density polyethylene composition may comprise less than 15 percent by weight of units derived from one or more α-olefin comonomers; or in the alternative, the linear low density polyethylene composition may comprise less than 14 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The linear low density polyethylene composition may comprise at least 65 percent by weight of units derived from ethylene. All individual values and subranges from at least 65 weight percent are included herein and disclosed herein; for example, the linear low density polyethylene composition may comprise at least 65, 75, 85, 95 or 100 percent by weight of units derived from ethylene.

All individual values and subranges of less than 0.1 vinyls per one thousand carbons atoms are included herein and disclosed herein; for example, the vinyls per one thousand carbon atoms may be from an upper limit of 0.01, 0.02, 0.03, 0.04, 0.05, 0.06, 0.07, 0.08, 0.09, or 0.1 vinyls per one thousand carbon atoms present in the backbone of the linear low density polyethylene composition.

In an alternative embodiment, the instant invention provides a composition, tape, composite pipe, process for making a composite pipe, and system for conveying high pressure fluids in accordance with any of the preceding embodiments, except that the thermoplastic polymer comprises a low density polyethylene composition having a has a density in the range of 0.915 to 0.930 g/cm$^3$, a melt index ($I_2$) in the range of 0.1 to 5 g/10 minutes, and a molecular weight distribution ($M_w/M_n$) in the range of 6 to 10. The low density polyethylene has a density in the range of from 0.915 to 0.930 g/cm$^3$; for example, from 0.915 to 0.925 g/cm$^3$; or in the alternative, from 0.918 to 0.922 g/cm$^3$. The low density polyethylene has a melt index ($I_2$) in the range of from 0.1 to 5 g/10 minutes; for example, from 0.5 to 3 g/10 minutes; or in the alternative, from 1.5 to 2.5 g/10 minutes. The low density polyethylene has a molecular weight distribution ($M_w/M_n$) in the range of from 6 to 10; for example, from 6 to 9.5; or in the alternative, from 6 to 9; or in the alternative, from 6 to 8.5; or in the alternative, from 7.5 to 9. In an alternative embodiment, the low density polyethylene has a long chin branching of at least 2 per 1000 carbon and/or up to 4 per 1000 carbon. The low density polyethylene has a peak at 32.7 ppm measured via $^{13}C$ NMR indicating the presence of the $C_3$ carbon of a $C_5$ or amyl branch in the LDPE component.

In an alternative embodiment, the instant invention provides a composition, tape, composite pipe, process for making a composite pipe, and system for conveying high pressure fluids in accordance with any of the preceding embodiments, except that the thermoplastic polymer comprises a blend of the foregoing linear low density polyethylene composition and low density polyethylene composition. The blend can comprise from 70 to 90 percent by weight of the linear low density polyethylene (LLDPE); for example, from 75 to 85 weight percent; or in the alternative from 78 to 82 weight percent, based on the total weight of the blend composition. The blend composition may comprise from 10 to 30 percent by weight of a low density polyethylene; for example, from 15 to 25 weight percent; or in the alternative, from 18 to 22 weight percent. The blend suitable for comprises from 10 to 30 percent by weight of a low density polyethylene; for example, from 15 to 25 weight percent; or in the alternative, from 18 to 22 weight percent.

The structural fibers useful in the invention include structural fibers and flexible yarn components. The structural fibers can be formed of graphite, glass, carbon, KEVLAR, aramid, fiberglass, boron, polyester fibers, polyamide, ceramic, inorganic or organic polymer fibers, and mineral based fibers such as basalt fibers. The flexible yarn components, or braiding fibers, graphite, glass, carbon, KEVLAR, aramid, fiberglass, boron, polyester fibers, polyamide, ceramic, inorganic or organic polymer fibers, and mineral based fibers such as basalt fibers.

The fibers included in the inner layer are substantially uniformly dispersed in the polymer composition.

In particular embodiments, the fibers are biaxially or triaxially braided.

In an alternative embodiment, the instant invention provides a composition, tape, composite pipe, process for making a composite pipe, and system for conveying high pressure fluids in accordance with any of the preceding embodiments, except that the composition comprises from 40 to 80 percent by weight component (c) and 60 to 20 percent by weight component (a).

All individual values and subranges from 20 to 60 percent by weight component (a) are included herein and disclosed herein; for example, the amount component (a) in the composition can be from a lower limit of 20, 24, 28, 32, 36, 40, 44, 48, 52, 56 or 59, percent by weight to an upper limit of 21, 25, 34, 38, 42, 46, 50, 54, 58, or 60 percent by weight. For example, the amount component (a) in the composition may be in the range of from 20 to 60 percent by weight, or in the alternative, the amount component (a) in the composition may be in the range of from 25 to 35 percent by weight, or in the alternative, the amount component (a) in the composition may be in the range of from 24 to 36 percent by weight, or in the alternative, the amount component (a) in the composition may be in the range of from 23 to 37 percent by weight, or in the alternative, the amount component (a) in the composition may be in the range of from 20 to 40 percent by weight.

All individual values and subranges from 40 to 80 percent by weight component (c) are included herein and disclosed herein; for example, the amount component (c) in the composition can be from a lower limit of 40, 45, 50, 55, 60, 65, 70 or 75 percent by weight to an upper limit of 44, 49, 54, 59, 64, 69, 74, 79 or 80 percent by weight. For example, the amount component (c) in the composition may be in the range of from 40 to 80 percent by weight, or in the alternative, the amount component (c) in the composition may be in the range of from 65 to 75 percent by weight, or in the alternative, the amount component (c) in the composition may be in the range of from 64 to 76 percent by weight, or in the alternative, the amount component (c) in the composition may be in the range of from 63 to 77 percent by weight, or in the alternative, the amount component (c) in the composition may be in the range of from 60 to 80 percent by weight.

In an alternative embodiment, the instant invention provides a composition, tape, composite pipe, process for making a composite pipe, and system for conveying high pressure fluids in accordance with any of the preceding embodiments, except that the composition comprises from 3 to 10 percent by weight of particles (b) based on the weight of the thermoplastic polymer (a). All individual values and subranges from 3 to 10 percent by weight of particles (b) based on the weight of the thermoplastic polymer (a) are included herein and disclosed herein; for example, the amount of particles (b) in the composition can be from a lower limit of 3, 3.4, 3.8, 4.2, 4.6, 5, 5.4, 5.8, 6.2, 6.6 or 6.9 percent by weight based on the weight of the thermoplastic polymer (a) to an upper limit of 3.1, 3.5, 3.9, 4.3, 4.7, 5.1, 5.5, 5.9, 6.3, 6.7, 7.2, 7.7, 8.2, 8.7, 9.3, 9.8 or 10 percent by weight based on the weight of the thermoplastic polymer (a). For example, the amount of particles (b) in the composition may be in the range of from 3 to 10 percent by weight based on the weight of the thermoplastic polymer (a), or in the alternative, the amount of particles (b) in the composition may be in the range of from 3.7 to 6.7 percent by weight based on the weight of the thermoplastic polymer (a), or in the alternative, the amount of particles (b) in the composition may be in the range of from 5 to 10 percent by weight based on the weight of the thermoplastic polymer (a), or in the alternative, the amount of particles (b) in the composition may be in the range of from 6 to 9 percent by weight based on the weight of the thermoplastic polymer (a), or in the alternative, the amount of particles (b) in the composition may be in the range of from 7 to 8 percent by weight based on the weight of the thermoplastic polymer (a), or in the alternative, the amount of particles (b) in the composition may be in the range of from 4.5 to 10.5 percent by weight based on the weight of the thermoplastic polymer (a).

In an alternative embodiment, the instant invention provides a composition, tape, composite pipe, process for making a composite pipe, and system for conveying high pressure fluids in accordance with any of the preceding embodiments, except that the core of each particle (b) comprises an iron oxide.

In an alternative embodiment, the instant invention provides a composition, tape, composite pipe, process for making a composite pipe, and system for conveying high pressure fluids in accordance with any of the preceding embodiments, except that the core material is selected from the group consisting of Fe, Co and Ni; oxides of Fe, Co and/or Ni, such as $Fe_3O_4$ and gamma-$Fe_2O_3$; spinel-type ferromagnetic materials such as $MgFe_2O_4$, $MnFe_2O_4$ and $CoFe_2O_4$; alloys, such as $CoPt_3$ and FePt; and combinations of two or more thereof.

In an alternative embodiment, the instant invention provides a composition, tape, composite pipe, process for making a composite pipe, and system for conveying high pressure fluids in accordance with any of the preceding embodiments, except that the core material comprises one or more iron oxides selected from the group consisting of haematite, magnetite and maghemite, or a mixture of two or three of these iron oxides.

In an alternative embodiment, the instant invention provides a composition, tape, composite pipe, process for making a composite pipe, and system for conveying high pressure fluids in accordance with any of the preceding embodiments, except that the core material consists essentially of one or more iron oxides selected from the group consisting of haematite, magnetite and maghemite, or a mixture of two or three of these iron oxides.

The proportions of core material and of shell material within the core/shell structure can vary within wide limits as a function of core material, of the thickness of the shell, and of the structure of the particles, isolated or aggregated. The proportions of the core material and of the shell material are generally in each case from 10 to 90% by weight.

All individual values and subranges from 10 to 90 wt % are included herein and disclosed herein; for example, the amount of core in the core/shell structure can be from a lower limit of 10, 20, 30, 40, 50, 60, 70, 80, or 89 wt % to an upper limit of 15, 25, 35, 45, 55, 65, 75, 85 or 90 wt %. For example, the amount of the core in the core/shell structure may be in the range of from 10 to 90 wt %, or in the alternative, the amount of the core in the core/shell structure may be in the range of from 50 to 90 wt %, or in the alternative, the amount of the core in the core/shell structure may be in the range of from 50 to 80 wt %, or in the alternative, the amount of the core in the core/shell structure may be in the range of from 75 to 85 wt %.

Likewise, all individual values and subranges from 10 to 90 wt % with respect to the amount of shell in the core/shell structure are included herein and disclosed herein; for example, the amount of shell in the core/shell structure can be from a lower limit of 10, 20, 30, 40, 50, 60, 70, 80, or 89 wt % to an upper limit of 15, 25, 35, 45, 55, 65, 75, 85 or 90 wt %. For example, the amount of the shell in the core/shell structure may be in the range of from 10 to 90 wt %, or in the alternative, the amount of the shell in the core/shell structure may be in the range of from 10 to 50 wt %, or in the alternative, the amount of the shell in the core/shell structure may be in the range of from 30 to 50 wt %, or in the alternative, the amount of the core in the core/shell structure may be in the range of from 15 to 25 wt %.

In an alternative embodiment, the instant invention provides a composition, tape, composite pipe, process for making a composite pipe, and system for conveying high pressure fluids in accordance with any of the preceding embodiments, except that each particle of the particles (b) comprises from 50 to 90% by weight core and from 10 to 50% by weight shell.

In an alternative embodiment, the instant invention provides a composition, tape, composite pipe, process for making a composite pipe, and system for conveying high pressure fluids in accordance with any of the preceding embodiments, except that the particles (b) are substantially uniformly distributed in the composition.

In an alternative embodiment, the instant invention provides a composition, tape, composite pipe, process for making a composite pipe, and system for conveying high pressure fluids in accordance with any of the preceding embodiments, except that the pipe can withstand fluid pressures up to 3000 psig. All individual values and subranges of up to 3000 psig are included herein and disclosed herein; for example, the pipe may withstand pressures up to 2500 psig, or in the alternative, the pipe may withstand pressures up to 2000 psig, or in the alternative, the pipe may withstand pressures up to 1500 psig, or in the alternative, the pipe may withstand pressures up to 1000 psig, or in the alternative.

In an alternative embodiment, the instant invention provides a composition, tape, composite pipe, process for making a composite pipe, and system for conveying high pressure fluids in accordance with any of the preceding embodiments, except that system may convey fluids at pressures from 750 to 1500 psig. All individual values and subranges from 750 to 1500 psig are included herein and disclosed herein; for example, the system may convey fluids at pressures from m a lower limit of 750, 900, 1050, 1200, 1350 or 1475 psig to an upper limit of 800, 950, 1100, 1250, 1400, or 1500 psig. For example, the system may convey fluids at a pressure in the range of from 750 to 1500 psig, or in the alternative, the system may convey fluids at a pressure in the range of from 950 to 1500 psig, or in the alternative, the system may convey fluids at a pressure in the range of from 1050 to 1500 psig, or in the alternative, the system may convey fluids at a pressure in the range of from 1150 to 1500 psig, or in the alternative.

In yet an alternative embodiment, the instant invention provides a process for making a composite pipe, in accordance with any of the preceding embodiments, except that the time to form a bond between the tape and one or more adjacent layers is independent of the diameter of the composite pipe.

In yet an alternative embodiment, the instant invention provides a process for making a composite pipe, in accordance with any of the preceding embodiments, except that the time to form a bond between the tape and one or more adjacent layers is independent of the thickness of any of the at least one core layer.

In yet an alternative embodiment, the instant invention provides a process for making a composite pipe, in accordance with any of the preceding embodiments, except that the time to form a bond between the tape and one or more adjacent layers is independent of the thickness of any of the at least one shell layer.

In yet an alternative embodiment, the instant invention provides a process for making a composite pipe, in accordance with any of the preceding embodiments, except that the time to form a bond between the tape and one or more adjacent layers is independent of the thickness of any of the at least one inner layer.

In an alternative embodiment, the instant invention provides a process for making a composite pipe, in accordance with any of the preceding embodiments, except that the magnetic field has a frequency in the range of from 80 kHz to 30 MHz.

In an alternative embodiment, the instant invention provides a process for making a composite pipe, in accordance with any of the preceding embodiments, except that the magnetic field has a frequency in the range of from 250 kHz to 2 MHz. All individual values and subranges from 250 kHz to 2 MHz is included herein and disclosed herein; for example, the frequency of the magnetic field may have a lower limit of 250, 350, 450, 550, 650, 750, 850, 950, 1050, 1150, 1250, 1350, 1450, 1550, 1650, 1750, 1850, or 1950 kHz to an upper limit of 300, 400, 500, 600, 700, 800, 900, 1000, 1100, 1200, 1300, 1400, 1500, 1600, 1700, 1800, 1900, or 2000 kHz. For example, the frequency of the magnetic field may be in the range of from 250 kHz to 2 MHz, or in the alternative, the frequency of the magnetic field may be in the range of from 350 kHz to 1 MHz, or in the alternative, the frequency of the magnetic field may be in the range of from 400 kHz to 700 kHz, or in the alternative, the frequency of the magnetic field may be in the range of from 440 kHz to 600 kHz.

In an alternative embodiment, the instant invention provides a composition consisting essentially of: (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a).

In an alternative embodiment, the instant invention provides a composition comprising: (a) a thermoplastic polymer; (b) a plurality of particles, each said particle consisting essentially of (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a).

In an alternative embodiment, the instant invention provides a composition comprising: (a) a thermoplastic polymer; (b) a plurality of particles, each said particle consisting essentially of (i) a core consisting of one or more magnetic materials and (ii) a shell consisting of silicon dioxide; and (c) structural fibers, wherein the composition comprises particles (b) in an amount from 1 to 30 wt % based on the weight of the thermoplastic polymer (a).

In an alternative embodiment, the instant invention further provides a tape consisting essentially of: a composition which comprises (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a).

In an alternative embodiment, the instant invention further provides a tape comprising: a composition which consisting essentially of (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a).

In yet another alternative embodiment, the instant invention further provides a process for making a composite pipe consisting essentially of: selecting a core layer; selecting a tape comprising a composition which comprises (a) a thermoplastic polymer; (b) a plurality of particles, each said particle comprising (i) a core comprising one or more magnetic materials and (ii) a shell comprising silicon dioxide; and (c) structural fibers, wherein the composition comprises particles (b) in an amount from 1 to 30 wt % based on the weight of the thermoplastic polymer (a); disposing the tape onto at least one surface of the core layer thereby forming a core-tape intermediate; and subjecting the core-tape intermediate to a magnetic field to form a bond between the tape and the core layer.

The rate of temperature increase of a tape according to the embodiments of the invention disclosed herein may be increased by: (1) increasing the amount of particles (b) used in the composition, and/or (2) by increasing the frequency of the magnetic field to which the tape is subjected.

EXAMPLES

The following examples illustrate the present invention but are not intended to limit the scope of the invention.

Each of Inventive Examples 1-4 contained CONTINUUM DGDA-2490 high density polyethylene (commercially available from The Dow Chemical Company). CONTINUUM DGDA-2490 has a density of 0.949 g/cm3 and an $I_2$ of 0.080 g/10 minutes. Inventive Examples 1-4 further contained 1, 4, 7 and 10 wt % MAGSILICA 310 (commercially available from Evonik Industries), respectively, based on weight of the CONTINUUM DGDA-2490 high density polyethylene.

Tapes comprising each of the Inventive Example 1-4 compositions were prepared by compression molding. The resulting tapes had a thickness of 0.25 inch. The tapes were each separately subjected to magnetic field of 440 kHz and the temperature of the tapes was monitored by thermocouple as a function of time starting at the onset of the magnetic field. The magnetic field was discontinued when the temperature of the samples reached 140° C.

As can be seen in FIGS. 2-5, the higher percentage of MAGSILICA particles, the faster the tape temperature rose.

Test Methods

Test methods include the following:

Density

Density (g/cm$^3$) is measured according to ASTM-D 792-03, Method B, in isopropanol. Specimens were measured within 1 hour of molding after conditioning in the isopropanol bath at 23° C. for 8 min to achieve thermal equilibrium prior to measurement. The specimens are compression molded according to ASTM D-4703-00 Annex A with a 5 min initial heating period at about 190° C. and a 15° C./min cooling rate per Procedure C. The specimen is cooled to 45° C. in the press with continued cooling until "cool to the touch."

Molecular Weight Distribution

The molecular weight distributions of the ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 μm columns and one Shodex HT803M 150 mm, 12 μm column. The solvent used was 1,2,4 trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.,* 6, 621 (1968)):

$M$polyethylene=$A$×($M$polystyrene)$^B$, where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatography Polym. Chpt* 12, (1992) and Balke, Thitiratsakul, Lew, Cheung, Mourey, *Chromatography Polym. Chpt* 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.,* 16, 1099 (1948)) and Kratochvil (Kratochvil, P., *Classical Light Scattering from Polymer Solutions,* Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing 2$^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

(2)

$$\overline{Mn} = \frac{\sum_i Wf_i}{\sum_i \left(\frac{Wf_i}{M_i}\right)} \quad \text{a)}$$

$$\overline{Mw} = \frac{\sum_i (Wf_i * M_i)}{\sum_i Wf_i} \quad \text{b)}$$

$$\overline{Mz} = \frac{\sum_i (Wf_i * M_i^2)}{\sum_i (Wf_i * M_i)} \quad \text{c)}$$

Monomodal distribution was characterized according to the weight fraction of the highest temperature peak in temperature rising elution fractionation (typically abbreviated as "TREF") data as described, for example, in Wild et al., *Journal of Polymer Science, Poly. Phys. Ed.,* Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column was equipped with both an infra-red detector and a differential viscometer (DV) detector. An ATREF-DV chromatogram curve was then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference.

Melting Temperature

Melt temperature and crystallization temperature are measured via Differential Scanning calorimetry (DSC). All of the results reported here are generated via a TA Instruments Model Q1000 DSC equipped with an RCS (refrigerated cooling system) cooling accessory and an auto sampler. A nitrogen purge gas flow of 50 ml/min was used throughout. The sample is pressed into a thin film using a press at 175° C. and 1500 psi (10.3 MPa) maximum pressure for about 15 seconds, then air-cooled to room temperature at atmospheric pressure. About 3 to 10 mg of material is then cut into a 6 mm diameter disk using a paper hole punch, weighed to the nearest 0.001 mg, placed in a light aluminum pan (ca 50 mg) and then crimped shut. The thermal behavior of the sample is investigated with the following temperature profile: The sample was rapidly heated to 180° C. and held isothermal for 3 minutes in order to remove any previous thermal history. The sample is then cooled to −40° C. at 10° C./min cooling rate and was held at −40° C. for 3 minutes. The sample is then heated to 150° C. at 10° C./min heating rate. The cooling and second heating curves are recorded.

Melt Index

Melt index ($I_2$) is measured at 190° C. under a load of 2.16 kg according to ASTM D-1238-03.

The present invention may be embodied in other forms without departing from the spirit and the essential attributes thereof, and, accordingly, reference should be made to the appended claims, rather than to the foregoing specification, as indicating the scope of the invention.

Vinyl Unsaturation

Vinyl unsaturation level is determined by a FT-IR (Nicolet 6700) in accordance with ASTM D6248-98.

$^{13}$C NMR

The samples were prepared by adding approximately 2.7 g of a 50/50 mixture of tetrachloroethane-$d_2$/orthodichlorobenzene containing 0.025 M Cr(AcAc)3 to 0.4 g sample in a Norell 1001-7 10 mm NMR tube, and then purging in a N2 box for 2 hours. The samples were dissolved and homogenized by heating the tube and its contents to 150° C. using a heating block and heat gun. Each sample was visually inspected to ensure homogeneity. The data were collected using a Bruker 400 MHz spectrometer equipped with a Bruker Dual DUL high-temperature CryoProbe. The data were acquired at 57-80 hours per data file, a 7.3 sec pulse repetition delay (6 sec delay+1.3 sec acquisition time), 90 degree flip angles, and inverse gated decoupling with a sample temperature of 120° C. All measurements were made on non spinning samples in locked mode. Samples were homogenized immediately prior to insertion into the heated (125° C.) NMR Sample changer, and were allowed to thermally equilibrate in the probe for 7 minutes prior to data acquisition. The branch number was calculated from the integral of the peak region at 32.7 ppm and its relative ratio of the peak of neat low density polethylene.

We claim:

1. A composite pipe comprising:
   at least one core layer;
   at least one shell layer; and
   at least one inner layer disposed between the core and shell layers, wherein the at least one inner layer comprises a tape in direct contact with the core layer, the tape composed of a composition comprising:
   (a) a thermoplastic polymer;
   (b) a plurality of particles, each said particle comprising
      (i) a core comprising one or more magnetic materials and
      (ii) a shell comprising silicon dioxide; and
   (c) structural fibers,
   wherein the composition comprises particles (b) in an amount from 1 to 30 wt % based on the weight of the thermoplastic polymer (a); and
   the composite pipe can withstand fluid pressure from 750 psig.

2. The composite pipe according to claim 1, wherein the thermoplastic polymer is an ethylene-based polymer having a density in the range of from 0.880 to 0.975 g/cm$^3$ and an $I_2$ in the range of from 0.01 to 1000 g/10 minutes.

3. The composite pipe according to claim 1, wherein the thermoplastic polymer is an ethylene-based polymer having a density in the range of from 0.925 to 0.960 g/cm$^3$ and an $I_2$ in the range of from 10 to 300 g/10 minutes.

4. The composite pipe according to claim 3, wherein the thermoplastic polymer is an ethylene-based polymer has a density in the range of from 0.940 to 0.955 g/cm$^3$ and an $I_2$ in the range of from 30 to 100 g/10 minutes.

5. The composite pipe according to claim 4, wherein the composition comprises from 40 to 80 percent by weight structural fibers (c) and 60 to 20 percent by weight thermoplastic polymer (a).

6. The composite pipe according to claim 5, wherein each particle of the plurality of particles (b) comprises from 50 to 90% by weight core and from 10 to 50% by weight shell.

7. The composite pipe according to claim 6, wherein the core of each particle of the plurality of particles (b) is selected from the group consisting of Fe, Co, Ni, $Fe_3O_4$, gamma-$Fe_2O_3$, $MgFe_2O_4$, $MnFe_2O_4$, $CoFe_2O_4$, $CoPt_3$, FePt, or a combination thereof.

8. The composite pipe according to claim 5, wherein the composition comprises from 1 to 10 percent by weight of particles (b) based on the weight of the thermoplastic polymer (a).

9. The composite pipe of claim 5 wherein the core layer is melt bonded directly to the tape.

10. The composite pipe of claim 9 wherein the core layer and the shell layer each is void of the particles comprising the magnetic materials.

11. The composite pipe of claim 9 wherein the shell layer is melt bonded directly to the tape.

12. The composite pipe according to claim 1, wherein the core of each particle of the plurality of particles (b) comprises an iron oxide.

13. The composite pipe according to claim 1, wherein the at least one inner layer comprising the tape is disposed on a surface of the core layer.

14. The composite pipe according to claim 1, wherein the pipe can withstand fluid pressure from 1000 psig to 3000 psig.

15. A system comprising the composite pipe according to claim 1, for conveying a fluid under a pressure from 1000 psig to 3000 psig.

16. The composite pipe according to claim 1, wherein the pipe can withstand fluid pressure from 750 psig to 1500 psig.

* * * * *